(12) United States Patent
Mansour

(10) Patent No.: US 6,292,671 B1
(45) Date of Patent: Sep. 18, 2001

(54) DISPATCH MODE IN CODE DIVISION MULTIPLE ACCESS SYSTEMS

(75) Inventor: Nagi A. Mansour, Overland Park, KS (US)

(73) Assignee: Sprint Spectrum L.P., Kansas City, MO (US)

( * ) Notice: Subject to any disclaimer, the term of this patent is extended or adjusted under 35 U.S.C. 154(b) by 0 days.

(21) Appl. No.: 09/366,609

(22) Filed: Aug. 3, 1999

(51) Int. Cl.$^7$ ............................................. H04Q 7/20
(52) U.S. Cl. .................... 455/518; 455/524; 455/445; 455/456; 370/335; 370/342
(58) Field of Search ........................ 455/518, 519, 455/456, 445, 517, 524, 520; 370/342, 335, 260, 261, 349, 338, 310, 320, 441, 479

(56) References Cited

U.S. PATENT DOCUMENTS

| | | |
|---|---|---|
| 4,191,860 | 3/1980 | Weber . |
| 5,247,571 | 9/1993 | Kay et al. . |
| 5,303,285 | 4/1994 | Kerihuel et al. . |
| 5,353,331 | 10/1994 | Emery et al. . |
| 5,416,770 * | 5/1995 | Stoner et al. ........................ 370/60 |
| 5,694,463 | 12/1997 | Christie et al. . |
| 5,850,611 * | 12/1998 | Krebs .................................. 455/518 |
| 5,852,781 * | 12/1998 | Ahvenainen ....................... 455/509 |
| 5,924,041 * | 7/1999 | Alperovich et al. ................ 455/456 |
| 5,930,723 * | 7/1999 | Heiskari et al. .................... 455/518 |
| 5,970,417 * | 10/1999 | Toyryla et al. ...................... 455/519 |
| 5,983,099 * | 11/1999 | Yao et al. ............................ 455/426 |
| 6,005,848 * | 12/1999 | Grube et al. ........................ 370/266 |
| 6,021,326 * | 2/2000 | Nguyen ............................... 455/422 |

\* cited by examiner

*Primary Examiner*—William Trost
*Assistant Examiner*—Marceau Milord
(74) *Attorney, Agent, or Firm*—Hovey, Williams, Timmons & Collins

(57) ABSTRACT

A method of providing dispatch mode calling in a code division multiple access (CDMA) wireless network (10). The method includes the steps of defining at least one dispatch mode talk-group, receiving a dispatch mode call request from an originating mobile phone (48) in the talk-group, determining location information for destination mobile phones (50, 52, 54, 56) in the talk-group, and encoding and sending the voice packets to the destination phones, along with information to enable the destination phones to decipher the encoded voice packets.

7 Claims, 3 Drawing Sheets

DISPATCH MODE IN CODE DIVISION MULTIPLE ACCESS SYSTEMS

BACKGROUND OF THE INVENTION

1. Field of the Invention

The present invention relates to wireless telecommunications, and in particular, to a method of providing dispatch mode calling in a code division multiple access wireless network.

2. Description of the Prior Art

"Dispatch mode" is a radio communications technique where one radio communicates to many other radios using short bursts of communications. Many groups such as taxi drivers and police officers desire to communicate with dispatch mode radio devices because it allows them to speak with a number of other people at the same time without initiating a plurality of separate phone calls. Until recently, dispatch mode services were only available in two-way radio systems such as walkie talkies. Although these radio systems work effectively when all of the users are located close together, they become ineffective once the users travel beyond the range of the radio transceivers.

Nextel has recently begun offering dispatch mode operations in its enhanced specialized mobile radio (ESMR) systems. ESMR can be deployed on a cellular network and, therefore, supports network features that enable users to operate in dispatch mode over greater distances. ESMR systems use time division multiple access (TDMA) technology which allocates a discrete amount of frequency band width to each user of the system to permit many simultaneous conversations. Each caller is allowed to transmit in predetermined time slots so that channelization of users in the same band is achieved through separation in time. Unfortunately, the capacity of these networks is limited by the number of available time slots. TDMA networks also suffer from poor call clarity, "hard" call hand-offs and minimal call security.

Companies such as Sprint PCS have recently begun offering wireless communication services using code division multiple access (CDMA) techniques. CDMA is a digital spread-spectrum modulation technique which digitizes wireless conversations and tags them with special codes. The digitized data is spread across the frequency band in a pseudo random pattern. Receiving mobile phones are instructed to decipher only the data corresponding to particular codes to reconstruct the signal. CDMA networks offer advantages over TDMA networks including increased network capacity, fewer dropped calls because of better hand-off methods, improved voice clarity, improved privacy and transmission security, and enhanced services such as text messaging and data transmissions. However, until now, CDMA wireless networks have not included dispatch mode calling capabilities.

SUMMARY OF THE INVENTION

The present invention solves the above-described problems and provides a distinct advance in the art of wireless telecommunications networks. More particularly, the present invention provides a method of providing dispatch mode calling in a CDMA wireless network.

The method of the present invention is implemented by first defining at least one talk-group consisting of a plurality of mobile phones in a CDMA network operated by users who wish to communicate with each other in a dispatch mode. To initiate a dispatch mode call, an originating phone sends a dispatch mode call request to the network. The dispatch mode call request is validated, then the location of the destination mobile phones in the talk-group is determined. Voice channels are then assigned to the members of the talk-group and a group code or mask is sent to each destination phone that enables the phones to demodulate or decode communications from the originating phone. Voice packets are received from the originating mobile phone, encoded, and sent to the destination phones. The destination mobile phones then decipher the encoded voice packets with the received mask.

The present invention permits dispatch mode calling between a plurality of users in a talk-group all located within the same sector of a telecommunications cell without adversely affecting the capacity of the cell. Specifically, the method assigns a first Walsh code to the forward traffic channel for the originating mobile phone that all mobiles listen to if they are located in the same sector, and a second Walsh code to the forward traffic channel for all other destination mobile phones that are located in a different sector. Thus, a dispatch mode call between mobile phones in the same sector of a telecommunications cell utilizes the same network capacity as a conventional wireless call between only two mobile phones.

The method of the present invention also provides dispatch mode calling for members of a talk-group even when the members are located in more than one telecommunications cell. This is achieved by replicating the encoded voice packets and routing a copy of the voice packets to each base station serving a cell in which any destination mobile phone is located. For example, if destination phones are located in three different telecommunications cells, the present invention includes the step of replicating the encoded voice packets and routing the voice packets to each of the three base stations serving the three cells.

BRIEF DESCRIPTION OF THE DRAWING FIGURES

A preferred embodiment of the present invention is described in detail below with reference to the attached drawing figures, wherein.

DETAILED DESCRIPTION OF THE PREFERRED EMBODIMENTS

System Architecture

Figure 1:
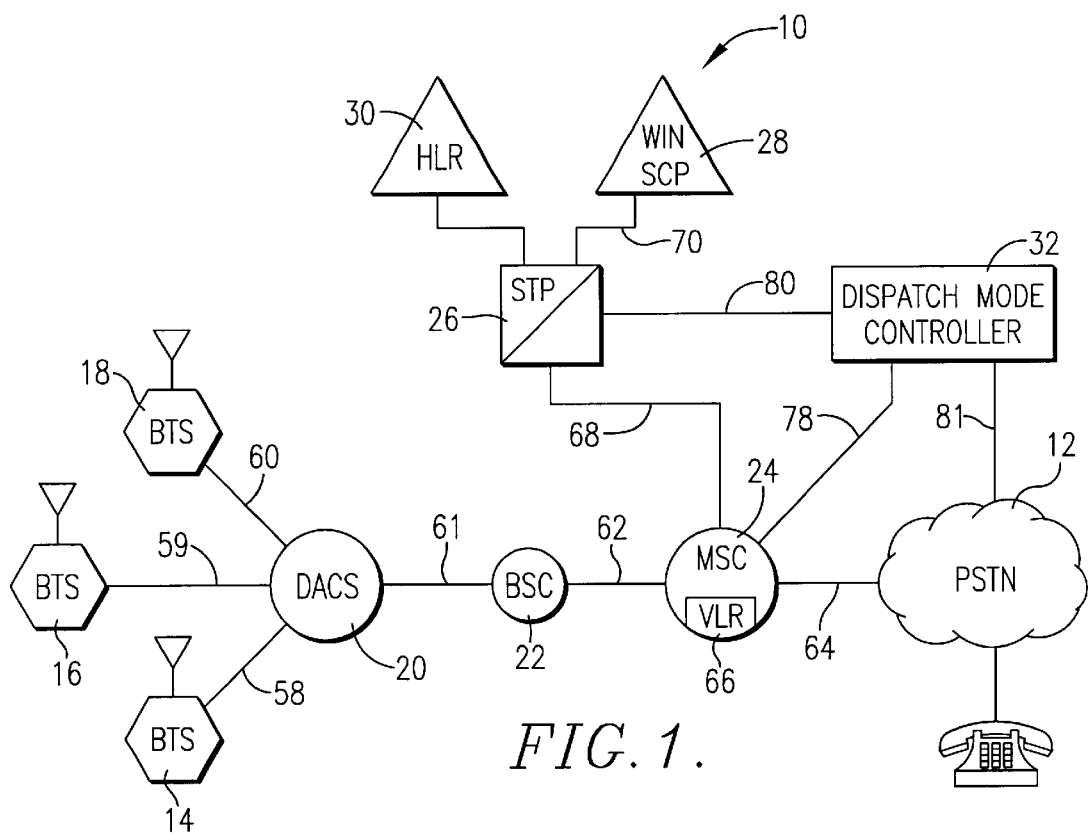
FIG. 1 is a schematic diagram broadly illustrating a code division multiple access wireless network configured to support dispatch mode calling in accordance with a preferred embodiment of the present invention.

Turning now to the drawing figures, an example of a wireless telecommunications network 10 that may be used to implement a preferred embodiment of the present invention is illustrated. The illustrated architecture is shown for purposes of disclosing a preferred embodiment and can be modified as a matter of design choice. The wireless network is preferably a code division multiple access (CDMA) PCS wireless intelligent network such as the PCS network owned and operated by Sprint PCS. As is well known in the art, the wireless network is coupled with a public switched telephone network (PSTN) 12. The PSTN refers to the entire local, long distance, and international landline phone system used in the United States, which includes well known components such as central office local exchange carriers (LECs) and interexchange carriers (IXCs).

The wireless network 10 broadly includes a plurality of base stations (BTSs) 14, 16, 18, a digital access and cross-connect system (DACS) 20, a base station controller (BSC) 22, a mobile switching center (MSC) 24, a signal transfer point (STP) 26, a wireless intelligent network service control point (WIN SCP) 28, and a home location register (HLR) 30, all interconnected by signaling data links and trunk circuits as described below. In accordance with the present invention, the wireless network also includes a dispatch mode controller (DMC) 32 operable to provide dispatch mode calling to mobile phones served by the network.

Figure 2:
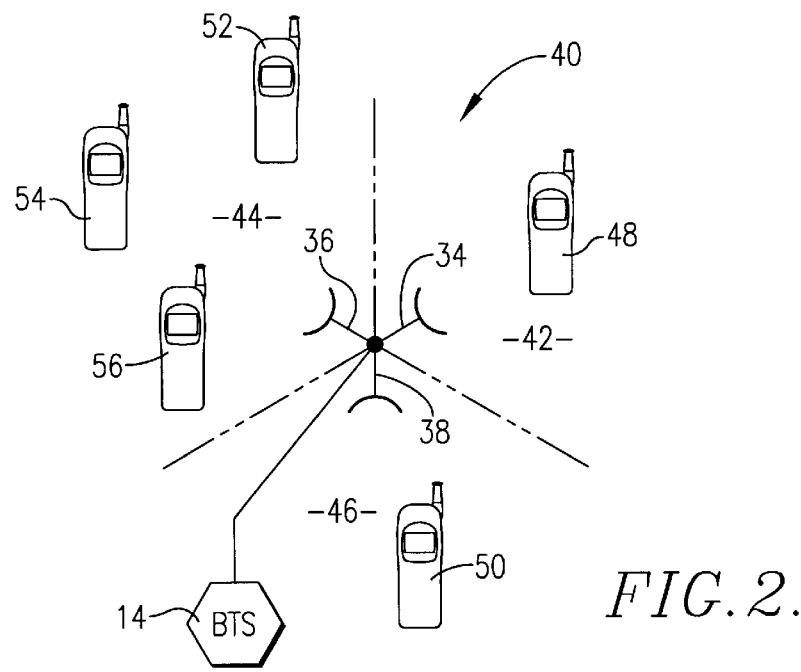
FIG. 2 is a schematic diagram of one base station of the wireless network.

The BTSs 14, 16, 18, which are well known in the art, provide wireless communications to and from mobile phones and other wireless devices. FIG. 2 illustrates one BTS 14 in more detail. The BTS includes a plurality of transceivers 34, 36, 38 coupled with one or more antennas that together provide wireless communications within a telecommunications cell 40, which is preferably subdivided into three sectors 42, 44, 46. The BTS serves a plurality of mobile stations 48, 50, 52, 54, 56 such as PCS/cellular phones located in the cell. The cell is preferably part of a CDMA PCS telecommunications network such as the Sprint PCS network described above. The preferred BTSs are operable to control transmission and reception of CDMA PCS traffic independently in the three sectors using selected ones of a defined set of codes for each sector. The codes may include, for example, Walsh codes. An example of a BTS that may be used with the present invention is the Nortel CDMA Outdoor 1900 MHZ base station. Those skilled in the art will appreciate that the wireless network may include numerous BTSs positioned in telecommunications cells throughout the country.

Returning to FIG. 1, the DACS 20 is coupled with the BTSs 14, 16, 18 with signaling data links and trunk circuits 58, 59, 60 and is operable for routing and switching control messages between the BTSs and the other components in the wireless network. The BSC 22 is coupled with the DACS with signaling data links and trunk circuits 61 and is operable to control operation of the DACS and the BTSs 14, 16, 18. The BSC is basically a high-capacity switch that provides total overview and control of wireless functions supported by the network such as call handoff control, cell configuration management, and BTS and mobile phone power level management. The BSC multiplexes signals from the BTSs into transmission signals that are sent to the MSC 24. The BSC also routes network signals and calls from other components of the wireless network to the appropriate BTS for transmission to the mobile stations.

The MSC 24 is coupled with the BSC 22 and other base station controllers with signaling data links and trunk circuits 62 and is operable to coordinate the establishment of calls to and from the mobile stations 48–56 and to handle transmission facilities management, mobility management, and call processing. The MSC is also connected with the PSTN 12 by signaling data links and trunk circuits 64 to provide switching between the wireless network and the PSTN.

The MSC 24 either includes an integrated visitor location register (VLR) 66 or is coupled with a stand-alone VLR. The VLR includes a database that contains information relating to visiting mobile phones that are roaming outside of their home service area. When a mobile phone is roaming in a visiting service area, the local provider in the visiting service area queries the HLR 30 through the STP 26 using Signaling System #7 (SS7) or other signaling to retrieve information needed to verify the legitimacy of the mobile phone and to obtain a profile of the features associated with the mobile phone. The HLR responds to the query by transferring the necessary data to the VLR. This information is maintained in the VLR of the local provider as long as the roaming mobile phone remains active within that coverage area. The HLR also updates its own database to indicate the current location of the roaming mobile phone so that it can divert calls to the phone through the local provider in the visiting service area. The querying process in the preferred wireless network is accomplished via SS7 links using the STP and SCP as described below.

The STP 26 is connected between the MSC 24 and the WIN SCP 28 by signaling data links 68 and 70 and is operable to route signaling messages therebetween. STPs are well known in the art with an example being the DSC Megahub.

The WIN SCP 28, which is well known in the art, preferably uses TCAP protocols to perform transaction processing for wireless calls. However, other signaling systems or means to exchange messages are equally applicable to the present invention. The WIN SCP is coupled with the STP 26 to exchange signaling messages with the MSC 24 and other mobile switching centers. The WIN SCP also includes a plurality of databases for providing intelligence and certain enhanced services to the wireless network as described herein.

The HLR 30 may be a database residing on the WIN SCP 28 or may be a stand-alone database servicing several SCPs. In either case, the HLR includes a database containing subscriber data and information used to identify a subscriber of the wireless network and subscriber data relating to features and services available to the subscriber. The HLR, which represents the "home" database for subscribers, may, for example, contain a record for each home subscriber that includes location information, subscriber status, subscribed features, and directory numbers. The HLR is used in conjunction with the VLR 66 as described above to support mobility management features to which the user has subscribed when that user is roaming outside of his home area.

As is well known in the art, the MSC 24, STP 26, WIN SCP 28, HLR 30, and VLR 66 all communicate via out of band signaling, typically using SS7 or TCP/IP protocols to facilitate the routing of calls through the wireless network. The signaling allows the network elements to exchange information to more quickly and efficiently route calls over the network.

Figure 3:
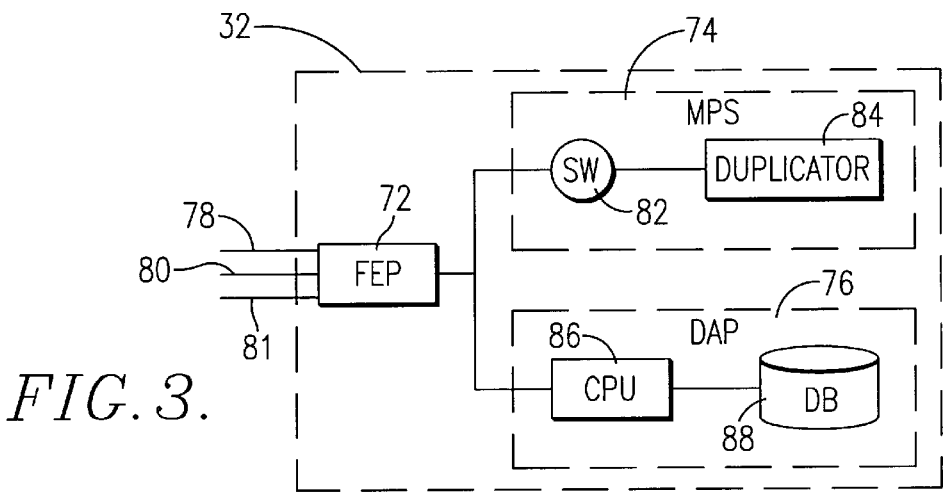
FIG. 3 is a schematic diagram of a dispatch mode controller constructed in accordance with a preferred embodiment of the present invention.

In accordance with the present invention, the dispatch mode controller (DMC) 32 is operatively coupled with the other components of the wireless network 10 to provide dispatch mode calling capabilities. As illustrated in FIG. 3, the DMC broadly includes a front end processor (FEP) 72, a metro packet switch (MPS) 74, and a dispatch application processor (DAP) 76.

The FEP 72 serves as an interface for coupling the DMC 32 with other components in the wireless network. In preferred forms, the FEP is coupled with the MSC 24 with data links and trunk circuits 78 to provide signaling and call routing therebetween. The FEP is also coupled with the STP 26 by signaling data links 80 to provide control signaling therebetween and with the PSTN 12 by data links and trunk circuits 81 to provide signaling and call routing therebetween.

The MPS 74 is coupled with the FEP 72 and includes a digital packet switch 82 and one or more packet duplicators 84. The MPS is operable to receive voice packets from the BTSs 14, 16, 18 via the MSC 24 to transport voice packets to the BTSs, and to route control information between the DAP 76 and the BTSs during a dispatch call.

The DAP 76 is coupled with the FEP 72 and includes a processor 86 and at least one database 88. The DAP maintains and tracks subscriber provisioning and mobility information for dispatch mode calls and is responsible for the overall coordination and control of dispatch mode services.

Dispatch Mode Operation

Setup

To permit dispatch mode calling in the above-described wireless network 10, an operator must first define or create "talk-groups" of mobile phone users who wish to at least occasionally communicate in dispatch mode. For example, one talk-group may consist of the mobile phones 48, 50, 52, 54, 56 illustrated in FIG. 2. Subsets of these mobile phones and/or additional phones may be part of another talk-group. This way, a user of any one of the mobile phones may be a part of a number of different talk-groups.

A talk group may include only two mobile phones or many phones. The mobile phones in a talk group may all be positioned within a "local dispatch location area" serviced by a single BTS, a "selected service area" served by several base stations connected to the same MSC, or a "Wide area" served by base stations positioned throughout the country serviced by a plurality of different MSCs.

Once the talk-groups have been defined, information relating thereto such as the identification of each talk-group and an identification number for each phone in a talk-group is stored in the database 88 of the DAP 76. For example, a lookup table indicating that talk-group number 1 consists of the mobile phones 48, 50, 52, 54, 56 illustrated in FIG. 2, talk-group number 2 consists of other mobile phones, etc. is stored in the database. The mobile identification number (MIN) for each mobile phone in a talk-group is also stored in the database or in an external database that can be accessed by the DAP.

The mobile phones 48, 50, 52, 54, 56 must also be configured to permit dispatch mode calling. Specifically, each phone must be configured to allow a user to indicate that he or she wishes to initiate a dispatch mode call rather than a conventional call. The phones may be equipped with dedicated dispatch mode keys for this purpose or may be programmed to recognize an entered code that triggers a dispatch mode call. Each mobile phone is also preferably programmed to include a menu that allows a user to select which talk-group he or she wishes to communicate with. For example, if one of the mobile phones is a part of three different talk-groups, the mobile phone must be programmed to allow the user to select with which talk-group he or she wishes to communicate.

Operation

Before describing the dispatch mode operation of the network 10, it is helpful to understand a few principles about the normal, non-dispatch mode operation of the network. To send a call to one of the mobile phones illustrated in FIG. 2, the BTS 14 transmits in the cell a long code to which the mobile identification number (MIN) of the phone is attached. Although all the phones in the cell receive the transmission, only the phone identified by the transmitted MIN can decode it.

Figure 5:
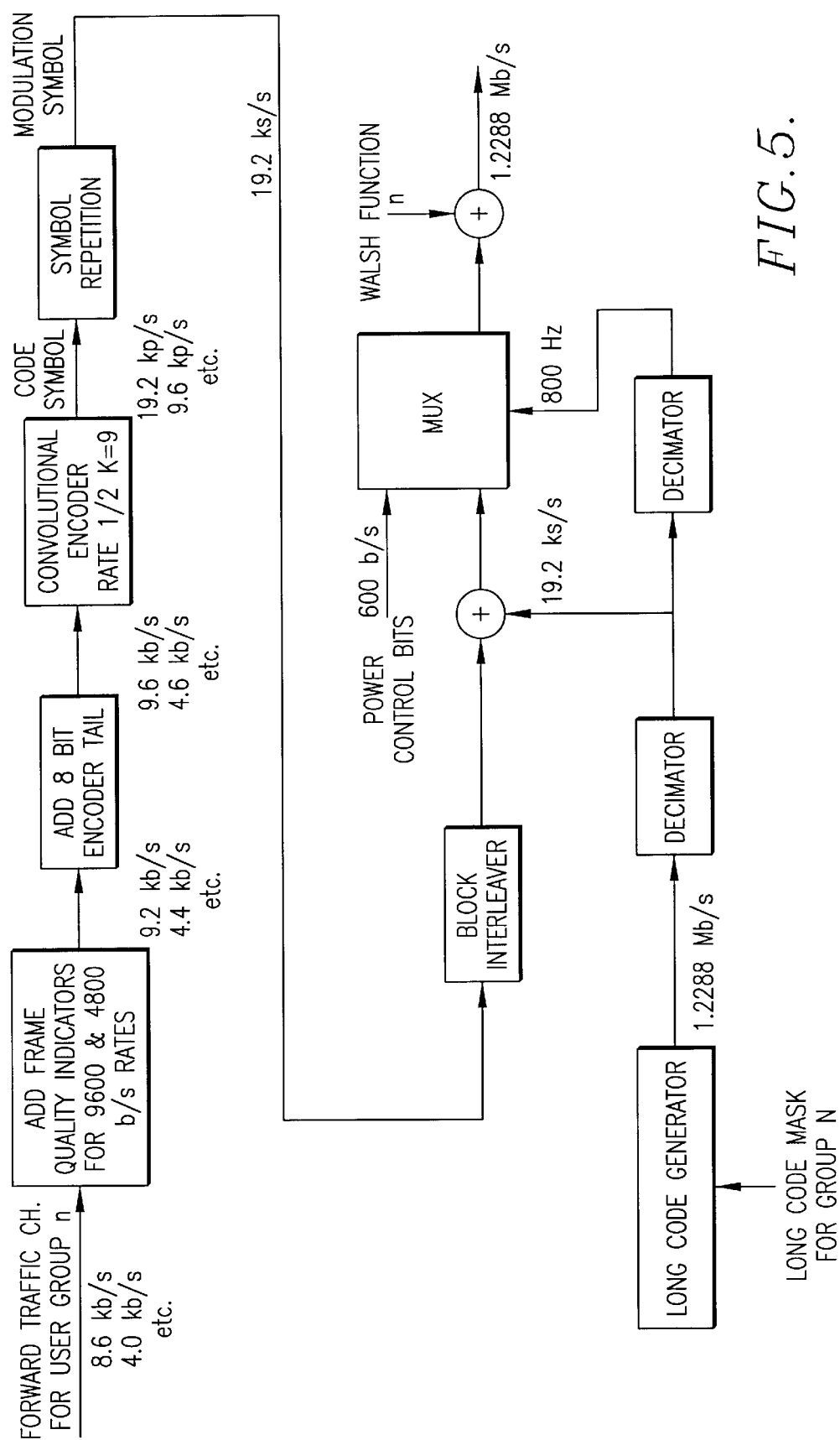
FIG. 5 is a schematic diagram illustrating the forward traffic channel structure for dispatch mode calling in the present invention.

As generally illustrated in FIG. 5, in the dispatch mode operation of the network, a group code that identifies a group of mobile phones is substituted for the MIN of a specific phone in the forward channel. This permits every phone in the group to decode a dispatch mode transmission.

Figure 4:
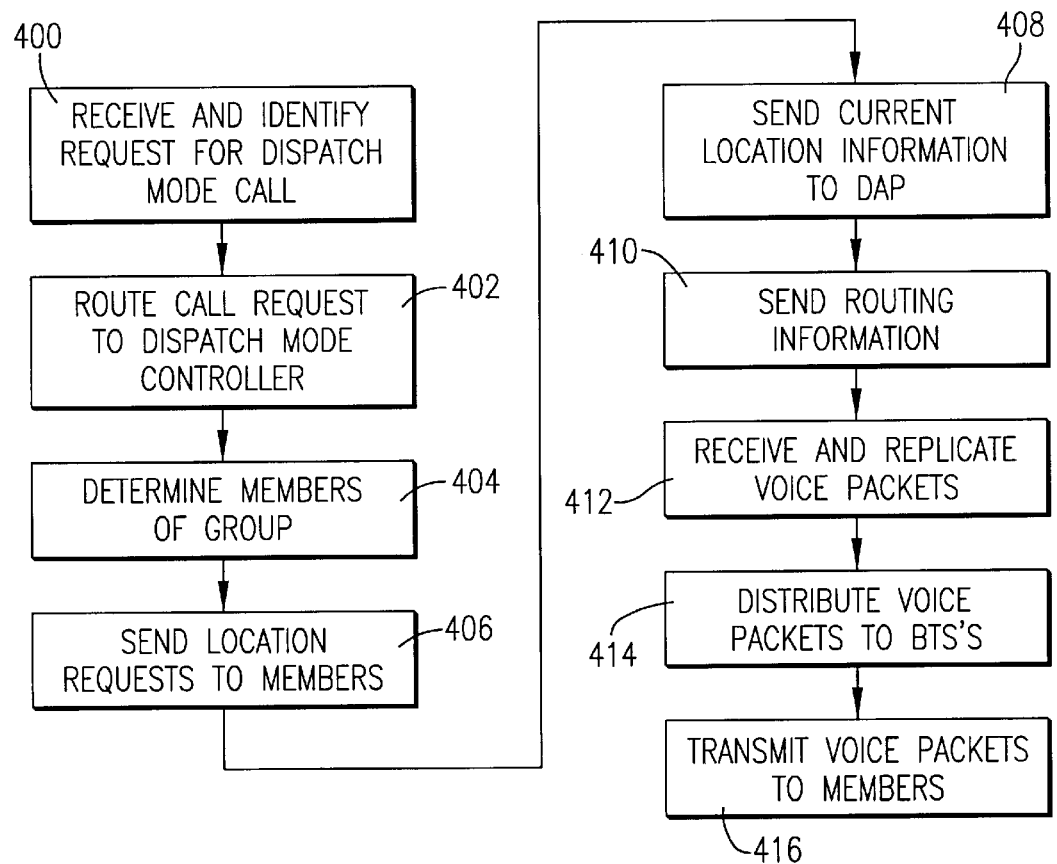
FIG. 4 is a flow diagram generally illustrating the steps performed by the wireless network when establishing a dispatch mode call.

In more detail, a preferred embodiment of the dispatch mode operation of the present invention can be best understood with reference to FIG. 2, which illustrates a talk-group of mobile phones 48, 50, 52, 54, 56 all positioned within a "local dispatch location area" such as a company campus served by a single BTS 14. Assume for this example that the mobile phone 48 (referred to herein as the "originating mobile phone") wishes to initiate a dispatch call to the mobile phones 50, 52, 54, 56 (referred to herein as the "destination mobile phones"). FIG. 4 generally illustrates the steps in completing such a call. The user of the originating mobile phone initiates a dispatch call by selecting a talk-group and then striking a dispatch mode call request key on his or her phone or entering a dispatch request code as described above. The mobile phone responds by transmitting a dispatch mode call request including an identification of the requested talkgroup to the originating BTS via a control channel as generally depicted in step 400. The BTS determines if it has available capacity to handle the call and ques the call if it does not.

If the BTS 14 has capacity available to handle the call, it routes the call request and talk-group identifier to the DACS 20. The DACS connects the request to the MSC 24, which recognizes that the call request is for a dispatch mode call and forwards the request to the DMC 32 as depicted in step 402. If the call request was not for a dispatch mode call, the MSC would handle the call request in a conventional manner.

Once the DMC 32 receives the dispatch mode call request, it validates the request and coordinates the dispatch mode call. Specifically, the processor 86 of the DAP 76 first accesses the database 88 to identify the members of the requested talk-group as depicted in step 404. The DAP then determines the status and current location of each destination mobile phone in the talk-group by sending a status and location query to the HLR 30 via the STP 26. The HLR responds with current cell and sector information for each mobile phone as depicted in steps 406 and 408.

If at least one of the destination mobile phones in the talk-group is available to receive the dispatch call, the DAP 76 signals the BTS 14 via the MSC 24 to provide voice channels to the originating mobile phone 48 and the destination phones 50, 52, 54, 56 that are available as depicted in step 410. Destination phones that are not initially available may be added to a dispatch call as they become available as they will be able to decode the signal.

While setting up voice channels, the DMC 32 instructs the BTS 14 to assign a first Walsh code to the forward traffic channel for the originating mobile phone 48 and a second Walsh code to the forward traffic channel for all destination mobile phones in one sector of the cell. If the destination mobile phones are in more than one sector as illustrated in FIG. 2, the DMC and BTS assign a separate Walsh code for each sector in which a destination phone is located.

During call setup, the DMC 32 and BTS also send each active member of a talk-group a group code that serves as a mask to allow all of the mobile phones in the group to demodulate or decode the dispatch mode call. This enables all members of a talk-group to participate in a dispatch mode call.

When the user of the originating mobile phone 48 begins to talk, the phone sends digitized voice packets to the BTS 14, which forwards them to the DMC 32 via the MSC 24 for processing. The packet switch 82 and packet duplicator 84 replicate the voice packets and distribute a copy to each cell in which one of the destination mobile phones is currently located as depicted in steps 412 and 414. In the example illustrated in FIG. 2, only one copy is required because all of the destination phones are in the same cell. However, if the DAP 76 determines that destination phones are in three different cells, the packet switch and packet duplicator make three copies of the voice packets and send a copy to the BTS serving each cell.

Similarly, the DAP 76 may determine that one of the destination mobile phones is currently roaming outside of the home coverage area of the MSC 24. Then, the DMC 32 would route the voice packets to the PSTN 12 for routing to the MSC and BTS in which the destination mobile phone in the talk group is currently roaming.

Once the BTS or BTSs receive the copied voice packets from the DMC 32, they transmit the voice packets in the cell or cells to the mobile phones in a conventional manner as depicted in step 416. Because all of the phones in a talk-group have been provided with the mask necessary to demodulate the transmitted voice packets, each destination mobile phone can decode the voice packets so that all the destination mobile phones can communicate with the originating mobile phone.

To regulate the power of mobile phones in a talk-group that are in the same cell, the BTS uses the closed loop power control to set the transmitted power of the mobile group that is usually in close by locations to an average value that will correspond to an acceptable FER value.

In addition to voice communications between members of a talk-group, the DMC 32 may also provide for the sending of call alerts, emergency calls, and status inquiries between members of a talk-group.

Although the invention has been described with reference to the preferred embodiment illustrated in the attached drawing figures, it is noted that equivalents may be employed and substitutions made herein without departing from the scope of the invention as recited in the claims.

Having thus described the preferred embodiment of the invention, what is claimed as new and desired to be protected by Letters Patent includes the following:

1. A method of providing dispatch mode calling in a CDMA wireless telecommunications network including a plurality of base stations each providing wireless service in a telecommunications cell, the method comprising the steps of:
   defining at least one talk-group consisting of a plurality of mobile phones in the CDMA network operated by users who wish to communicate with each other in a dispatch mode;
   receiving a dispatch mode call request from an originating mobile phone in the talk-group operated by a user wishing to initiate communication with destination mobile phones in the talk-group operated by other users;
   determining location information for the destination mobile phones in the talk-group; receiving voice packets from the originating mobile phone; encoding the voice packets;
   providing information to the destination mobile phones that enables the destination mobile phones to decipher the encoded voice packets; and
   transmitting the encoded voice packets to cells in the CDMA network in which the destination mobile phones are located so that the destination mobile phones can decipher the encoded voice packets to communicate with the user of the originating mobile phone, the transmitting step further including the steps of:
   determining in which cell each of the destination mobile phones are located;
   if all of the destination mobile phones are located in one cell, routing the encoded voice packets to a base station corresponding to the cell;
   if the destination mobile phones are located in a plurality of cells serviced by a single mobile switching center, replicating the encoded voice packets and routing the voice packets to all base stations serviced by the single mobile switching center corresponding to the cells in which the destination mobile phones are located; and
   if the destination mobile phones are located in a plurality of cells serviced by different mobile switching centers, replicating the encoded voice packets and routing the voice packets to all base stations corresponding to the cells in which the destination mobile phones are located via the mobile switching centers and a public switched telephone network coupled with the mobile switching centers.

2. The method as set forth in claim 1, wherein the CDMA wireless network transmits voice traffic to the mobile phones over forward traffic channels, the method further including the steps of assigning a firstWalsh code to a forward traffic channel for the originating mobile phone and assigning a second Walsh code to a forward traffic channel for all of the destination mobile phones.

3. The method as set forth in claim 1, wherein the user of the originating mobile phone requests a dispatch mode call by striking a dedicated key on the originating mobile phone.

4. The method as set forth in claim 1, wherein each of the mobile phones are operable to communicate both in a dispatch mode and in a conventional non-dispatch mode.

5. A wireless network using code division multiple access techniques comprising:
   a plurality of first base stations each providing wireless communication to a plurality of mobile phones positioned in a first telecommunications cell;
   a first base station controller coupled with the first base stations for controlling operation thereof;
   a first mobile switching center coupled with the first base station controller for managing and establishing calls destined for and originating from the mobile phones in the first telecommunications cell;
   a plurality of second base stations each providing wireless communication to a plurality of mobile phones positioned in a second telecommunications cell;
   a second base station controller coupled with the second base stations for controlling operation thereof;
   a second mobile switching center coupled with the second base station controller for managing and establishing calls destined for and originating from the mobile Dhones in the second telecommunications cell;
   a dispatch mode controller operatively coupled with the first mobile switching center and coupled with the second mobile switching center via a public switched telephone network and configured for providing dispatch mode calling between a plurality of mobile phones in a pre-defined talk-group, the dispatch mode controller including a dispatch application processor operable to:
- validate a dispatch mode call requested by an originating mobile phone in the talk-group;
- determine location information for destination mobile phones in the talk-group;
- receive voice packets from the originating mobile phone;
- encode the voice packets;
- provide information to the destination mobile phones that enables the destination mobile phones to decipher the encoded voice packets; and
- route the encoded voice packets to the first base stations corresponding to the cells in which the destination mobile phones are located via the first mobile switching center and route the encoded voice packets to the second base stations corresponding to the cells in which the destination mobile phones are located via the public switched telephone network and the second mobile switching center.

6. The wireless network as set forth in claim 5, the dispatch mode controller further including a packet duplicator operable to duplicate the voice packets and to send the voice packets to the base stations when the destination mobile phones are being served by more than one base station.

7. A wireless network using code division multiple access techniques comprising:
- a first telecommunications cell including
  - a plurality of base stations each providing wireless communication to a plurality of mobile phones positioned in the first telecommunications cell,
  - a base station controller coupled with the base stations for controlling operation thereof, and
  - a mobile switching center coupled with the base station controller for managing and establishing calls destined for and originating from the mobile phones in the first telecommunications cell;
- a second telecommunications cell including
  - a plurality of base stations each providing wireless communication to a plurality of mobile phones positioned in the second telecommunications cell,
  - a base station controller coupled with the base stations for controlling operation thereof, and
  - a mobile switching center coupled with the base station controller for managing and establishing calls destined for and originating from the mobile phones in the second telecommunications cell; and
- a dispatch mode controller coupled with the mobile switching center of the first telecommunications cell and indirectly coupled with the mobile switching center of the second telecommunications cell via a public switched telephone network, the dispatch mode controller being configured for providing dispatch mode calling between a plurality of mobile phones in a pre-defined talk group located in the first telecommunications cell and the second telecommunications cell.

* * * * *